United States Patent
Zaetterqvist (10) Patent No.: US 10,684,099 B2
(45) Date of Patent: *Jun. 16, 2020

(54) MAGAZINE, CARTRIDGE AND METHOD FOR LAUNCHING A COUNTERMEASURE

(71) Applicant: SAAB AB, Linkoeping (SE)

(72) Inventor: Christer Zaetterqvist, Uppsala (SE)

(73) Assignee: SAAB AB, Linkoeping (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/301,186

(22) PCT Filed: May 5, 2017

(86) PCT No.: PCT/SE2017/050441
§ 371 (c)(1),
(2) Date: Nov. 13, 2018

(87) PCT Pub. No.: WO2017/200459
PCT Pub. Date: Nov. 23, 2017

(65) Prior Publication Data
US 2019/0137220 A1    May 9, 2019

(30) Foreign Application Priority Data

May 17, 2016  (SE) ........................................ 1650665
Nov. 8, 2016  (SE) ........................................ 1651464

(51) Int. Cl.
*F41A 27/00* (2006.01)
*F41G 3/22* (2006.01)
(Continued)

(52) U.S. Cl.
CPC .................. *F41G 3/22* (2013.01); *B64D 1/02* (2013.01); *B64D 7/06* (2013.01); *F42B 5/155* (2013.01);
(Continued)

(58) Field of Classification Search
CPC . F42B 5/15; F42B 12/70; F41H 11/02; B64D 1/02; B64D 7/00; F41A 27/08
(Continued)

(56) References Cited

U.S. PATENT DOCUMENTS 2,391,956 A    1/1946 Eastman
2,467,514 A    4/1949 Woodman
(Continued)

FOREIGN PATENT DOCUMENTS

DE    3902624 A1    8/1990
EP    0253028 B1    8/1990
(Continued)

OTHER PUBLICATIONS

International Searching Authority, International Search Report and Written Opinion for International Application No. PCT/SE2017/050436, dated Jul. 21, 2017, 12 pages, Swedish Patent and Registration Office, Sweden.
(Continued)

*Primary Examiner* — Michael D David
(74) *Attorney, Agent, or Firm* — Alston & Bird LLP (57) ABSTRACT

A magazine for storing and launching countermeasures arranged in cartridges, comprising a plurality of longitudinal cartridge cases forming the magazine, where the magazine comprises a tilting means adapted to tilt the cartridge cases, such that the openings of the cartridge cases can be directed in a selected direction, and where the magazine comprises a tracking system comprising an active position sensor adapted to detect the position of an incoming object. The advantage of the invention is that a countermeasure can be directed towards an incoming object before it is launched.

15 Claims, 4 Drawing Sheets

(51) Int. Cl.
*B64D 1/02* (2006.01)
*F42B 5/155* (2006.01)
*B64D 7/06* (2006.01)
*G05D 1/00* (2006.01)
*B64D 7/00* (2006.01)
*F42B 12/70* (2006.01)
*F42B 12/48* (2006.01)
*B64D 1/04* (2006.01)
*B64D 7/08* (2006.01)
*F41H 11/02* (2006.01)

(52) U.S. Cl.
CPC ............ *G05D 1/0094* (2013.01); *B64D 1/04* (2013.01); *B64D 7/00* (2013.01); *B64D 7/08* (2013.01); *F41H 11/02* (2013.01); *F42B 12/48* (2013.01); *F42B 12/70* (2013.01)

(58) Field of Classification Search
USPC ........... 89/37.16–37.22, 37.01, 37.02, 41.14; 102/505
See application file for complete search history.

(56) References Cited

U.S. PATENT DOCUMENTS

| | | | |
|---|---|---|---|
| 3,808,595 | A | 4/1974 | Coop et al. |
| 3,934,846 | A | 1/1976 | Maurer |
| 4,280,394 | A | 7/1981 | Singenberger et al. |
| 4,674,393 | A | 6/1987 | Schaulin et al. |
| 5,198,609 | A | 3/1993 | Gillman |
| 5,340,054 | A | 8/1994 | Smith et al. |
| 5,699,981 | A | 12/1997 | McGrath et al. |
| 6,098,925 | A | 8/2000 | Burdsall, II et al. |
| 6,231,002 | B1 | 5/2001 | Hibma et al. |
| 7,640,858 | B1 | 1/2010 | Herbage et al. |
| 10,495,424 | B2 * | 12/2019 | Zaetterqvist ............ F42B 12/64 |
| 2001/0015126 | A1 | 8/2001 | Grunewald |
| 2003/0117309 | A1 | 6/2003 | Pappert et al. |
| 2004/0104309 | A1 | 6/2004 | Segota et al. |
| 2005/0204910 | A1 | 9/2005 | Padan |
| 2010/0294119 | A1 | 11/2010 | Buechler et al. |
| 2010/0326262 | A1 | 12/2010 | Galanti et al. |
| 2011/0155856 | A1 | 6/2011 | Zachrisson |
| 2012/0125183 | A1 | 5/2012 | Zätterqvist |
| 2012/0210855 | A1 | 8/2012 | Clark et al. |
| 2016/0121996 | A1 | 5/2016 | Eveker et al. |
| 2019/0092469 | A1 | 3/2019 | Zaetterqvist |
| 2019/0137220 | A1 * | 5/2019 | Zaetterqvist ............ F41F 1/08 |
| 2019/0178613 | A1 * | 6/2019 | Zaetterqvist ............ B64D 7/00 |

FOREIGN PATENT DOCUMENTS

| | | |
|---|---|---|
| EP | 1247735 A3 | 1/2004 |
| EP | 1194331 B1 | 5/2004 |
| EP | 2157398 A2 | 2/2010 |
| EP | 2279119 B1 | 12/2015 |
| EP | 2421754 B1 | 10/2016 |
| GB | 2410542 A | 8/2005 |
| GB | 2505721 A1 | 3/2014 |
| WO | WO 2010/123422 A1 | 10/2010 |
| WO | WO-2014/140587 A1 | 9/2014 |
| WO | WO-2015/072901 A1 | 5/2015 |

OTHER PUBLICATIONS

International Searching Authority, International Search Report and Written Opinion for International Application No. PCT/SE2017/050440, dated Jul. 21, 2017, 12 pages, Swedish Patent and Registration Office.
International Searching Authority, International Search Report and Written Opinion for International Application No. PCT/SE2017/050437, dated Jul. 21, 2017, 12 pages, Swedish Patent and Registration Office.
International Searching Authority, International Search Report and Written Opinion for International Application No. PCT/SE2017/050441, dated Jul. 21, 2017, 13 pages, Swedish Patent and Registration Office.
International Searching Authority, International Search Report and Written Opinion for International Application No. PCT/SE2017/050442, dated Aug. 4, 2017, 14 pages, Swedish Patent and Registration Office.
Extended European Search Report for European Patent Application No. 17799760.8, dated Nov. 18, 2019, (8 pages), European Patent Office, Munich, Germany.
Extended European Search Report for European Patent Application No. 17799758.2, dated Nov. 21, 2019, (6 pages), European Patent Office, Munich, Germany.
Extended European Search Report for European Patent Application No. 17799759.0, dated Nov. 21, 2019, (7 pages), European Patent Office, Munich, Germany.
Extended European Search Report for European Patent Application No. 17799763.2, dated Nov. 21, 2019, (7 pages), European Patent Office, Munich, Germany.
Extended European Search Report for European Patent Application No. 17799764.0, dated Nov. 26, 2019, (8 pages), European Patent Office, Munich, Germany.
International Searching Authority, International Search Report and Written Opinion for International Application No. PCT/SE2017/050438, dated Jul. 27, 2017, (12 pages), Swedish Patent and Registration Office, Sweden.

* cited by examiner

MAGAZINE, CARTRIDGE AND METHOD FOR LAUNCHING A COUNTERMEASURE

CROSS REFERENCE TO RELATED APPLICATIONS

This application is a National Stage Application, filed under 35 U.S.C. § 371, of International Application No. PCT/SE2017/050441, filed May 5, 2017, which claims priority to Swedish Application No. 1650665-1, filed May 17, 2016, and Swedish Application No. 1651464-8, filed Nov. 8, 2016; the contents of all of which are hereby incorporated by reference in their entireties.

BACKGROUND

Related Field

The present invention relates to a variable magazine for storing and launching countermeasures comprising a tracking system, where the firing direction of a countermeasure can be controlled in dependency of a signal from the tracking system. The countermeasure is comprised in an active protection system, and may be of either a soft-kill or a hard-kill type.

Description of Related Art

Arrangements for storing and launching payloads, such as countermeasures, which are designed to be mounted on aircrafts, are previously known. One such arrangement is a dispenser mounted on an aeroplane, which comprises an elongate body provided with at least one launch opening. The countermeasures are connected to a firing control unit for feeding firing signals to the countermeasures. The countermeasures can consist of passive means, such as chaff foil, but can also consist of for example IR flares, or other active measures. The countermeasures are stored in one or more magazines, where a magazine comprises a plurality of cartridges, with one countermeasure in each cartridge.

One problem with known dispensers mounted on aircrafts is that the launch angle of a countermeasure is fixed to a set angle which is believed to be optimal for the intended use. Depending on the purpose of the countermeasure, it may be of advantage to use different firing directions. If chaff is released, a preferred launch direction may be upwards towards a helicopter rotor, if flares are released, a preferred launch direction may be somewhat forwards and downwards. A dispenser mounted on an aeroplane may therefore be provided with several magazines, directed in different directions. A solution with a fixed launch angle may be a good solution for an aeroplane, which has a known flight direction and a known speed range.

For a helicopter, a fixed launch angle is however not optimal, since both flight angle, flight speed and the orientation of the aircraft may vary considerably. Helicopters may be provided with several magazines holding cartridges with countermeasures. Each magazine may be positioned at a predefined position and pointing in a predefined direction on the helicopter, such that several magazines will cover a larger firing range.

However, in some situations, a magazine may be directed in a direction that is not usable for a specific situation. With a magazine having a fixed position, it may in some situations be possible to steer the helicopter such that a desired firing direction of a countermeasure is obtained. Further, by using a magazine having a fixed position pointing in a fixed direction, the types of countermeasures that can be used is limited to countermeasures that does not require a high precision of the launch direction.

The known solutions will in some situations allow for firing a countermeasure in a desired direction. Even though these arrangements may give an acceptable result in some cases, there is room for improvements.

BRIEF SUMMARY

One object of the present invention is to at least partially eliminate the drawbacks associated with the solutions known in the prior art. Another object is to provide a magazine comprising a tracking system in which the launch angle can be controlled. Another object of the invention is to provide an aircraft comprising such a magazine.

The solution to the problem according to the invention is described in the characterizing part of claim 1. Claim 12 refers to an inventive cartridge adapted to be used in a magazine. Claim 14 refers to an advantageous method for launching a countermeasure. The other claims contain advantageous embodiments and further developments of the magazine, the cartridge and the method.

In a magazine for storing and launching countermeasures arranged in cartridges, comprising a plurality of longitudinal cartridge cases forming the magazine, where the cartridge cases are arranged to each other in a slidable manner in a longitudinal direction, and where the magazine comprises a tilting means adapted to tilt the cartridge cases, such that an opening of a cartridge case can be directed in a selected direction, the object of the invention is achieved in that the magazine comprises a tracking system comprising an active position sensor adapted to detect the position of an incoming object.

By this first embodiment of the magazine according to the invention, a magazine is provided, in which the cartridge cases of the magazine can be tilted with a selected angle in a desired direction in dependency of an active position sensor comprised in the tracking system, in order to be able to launch the countermeasure in the desired direction. When mounted on an aircraft, the selected angle depends on the direction of motion of the aircraft and on the relative azimuth and elevation angle to an incoming threat. When mounted on a vehicle or on the ground, the selected angle depends on the direction to an incoming threat. In this way, it is also possible to tilt the cartridge cases to a resting position in which the cartridge cases are directed in a predefined direction, e.g. away from an entrance opening of a helicopter. The resting position may also be a position in which the cartridge cases are arranged in the centre of the tilting mechanism, or in a predefined direction which is believed to be the "best choice" for a launch of a countermeasure. For a helicopter, the resting position may e.g. be directed outwards and sideways. A helicopter may e.g. carry more than one and up to four or more magazines, e.g. one at each corner, where the magazines may use the same or different resting positions.

It is also possible to use a system for launching countermeasures on ground comprising one or more variable magazines, which may be either mounted on a vehicle or mounted in a stationary way on ground. In a resting position for ground use, the cartridge cases are preferably tilted in a direction towards an enemy and away from the own troops.

A countermeasure is in these examples an expendable measure that is ejected from the magazine of an active protection system. It may be of a soft-kill type, such as a flare or chaff, or of a hard-kill type, such as a grenade or a short-range missile.

The magazine comprises a tracking system having an active position sensor. The active position sensor is adapted to detect the position of an incoming object, e.g. a passive shell launched from a handheld shell thrower. Such a shell does not emit any active signals such that it can be detected by a passive sensor. The active position sensor is preferably a radar or a lidar which sends out a signal and detects and analyses the reflected response. The active position sensor will detect the position of the incoming object and will preferably also be able to detect the speed of the incoming object as well as the distance and the aspect angles to the incoming object relative the magazine. The position and distance signals from the active position sensor are transferred to an electronic control unit positioned in the magazine or at an external position, e.g. in an aircraft or a vehicle. The electronic control unit is adapted to control the direction of the cartridge cases such that the opening of a cartridge case can be directed towards the incoming object.

One advantage of the inventive magazine is that the openings of the cartridge cases can be directed towards an incoming object. By being able to point directly towards an incoming object, it is possible to use countermeasures that can disarm or destroy the incoming object. Normal countermeasures can only disturb active incoming objects but have no effect on passive incoming objects. The inventive magazine will allow e.g. a helicopter, a vehicle or a ground base to protect itself from passive shells in an efficient and cost-effective way.

The electronic control unit that controls the tilting of the magazine and the launch of a countermeasure may be positioned in the magazine or may be integrated in an external control system, e.g. in an aircraft or a vehicle. It is also possible that the control of the tilting of the magazine, i.e. the tracking of an incoming object, is performed by an electronic control unit arranged in the magazine, and that the launch of a countermeasure is controlled by an external electronic control unit arranged in e.g. an aircraft or a vehicle. By both controlling the tilting of the magazine and the launch of a countermeasure by an electronic control unit arranged in the magazine, an autonomous track and launch system is obtained, which is able to detect and destroy an incoming object. Such a solution is especially advantageous for a ground mounted arrangement, where a magazine is mounted on a stand or a tripod. With an autonomous system comprised in a magazine, there is no need to connect the magazine to an external control system. Such a solution further allows an inventive magazine to be retrofitted to aircrafts without further modifications.

When an incoming object is detected by the tracking system, the cartridge cases are tilted in the direction of the incoming object, i.e. such that the centre axis of a cartridge case points in the direction of the incoming object. A fine tracking function of the tracking system will then continuously follow the incoming object and will continuously fine adjust the tilt angle of the cartridge cases to point directly at the incoming object. The fine tracking function will further preferably be able to detect the speed of the incoming object as well as the distance and the aspect angles to the incoming object, such that the tracking of the incoming object can be improved. When the incoming object reaches a predefined position in relation to the magazine, one or more countermeasures may be launched directly towards the incoming object in order to eliminate and destroy the incoming object.

Such a countermeasure may e.g. be a cluster of small metal pellets which will cause the incoming object to detonate.

Depending on the speed of the incoming object, the distance to the incoming object and the aspect angles to the incoming object, it is also possible to point the cartridge cases with an offset angle, such that the cartridge cases are directed to a position in front of the incoming object. This will compensate for the time delay when launching a countermeasure until the countermeasure reaches the incoming object.

The tracking system of the magazine is adapted to detect and follow an incoming object. The tracking system will in such an example be provided with an active position sensor such as a radar or lidar. It is also possible to integrate a vision system in the tracking system. A vision system can be used to identify the type of the incoming object and also to detect the position of, the speed of, the distance to and the aspect angles to the incoming object. A vision system may also be used to detect objects on the ground, such that a hostile detected object can be eliminated by launching e.g. a shell or the like.

The tracking system may be integrated in the magazine. The active position sensor is preferably integrated in one or more cartridge cases in the magazine, even if it also possible to position the active position sensor on the outside of the magazine. In one example, the active position sensor is integrated in a removable cartridge that is adapted to be positioned in a cartridge case. In this way, the magazine can be used either as a passive variable magazine adapted for countermeasures and being controlled from an external electronic control unit positioned in e.g. an aircraft, or as an active magazine comprising a tracking system, by inserting a cartridge comprising a tracking system. In this example, it is also possible to use cartridges having different active position sensors. In one example, an infrared active sensor may be used when the system is to be used during night, which may be replaced with another sensor suitable for other missions.

When the tracking system detects an incoming object and a countermeasure is to be launched in a direction detected by the tracking system, the cartridge cases are tilted to an active position, pointing in the desired launch direction. The preferred launch direction for a helicopter depends of the incoming threat, but is often to the rear of the helicopter. It is however of advantage to be able to direct the cartridge cases in a sideway direction or in a forward direction, since a helicopter may hover or fly in any direction. There are of course limitations for the possible tilting angle, but it is preferred that a cartridge case can be tilted in a first direction both forwards and rearwards by at least 30 degrees, and more preferably by at least 45 degrees. Further, it is of advantage that a cartridge case can be tilted in a second direction both forwards and rearwards by at least 30 degrees, and more preferably by at least 45 degrees. For a ground use, the preferred launch direction may e.g. be determined by sensors adapted to detect motion in the surroundings. Such a sensor may be a radar or a vision system.

The magazine is operated and tilted by at least one actuator, which is controlled by an electronic control unit. In one example, an input signal to the ECU may be a direction signal, which gives a desired pointing direction for a cartridge. The direction signal is obtained from the active position sensor. The input signal may also take account of the actual flight direction of the aircraft when the magazine is mounted on an aircraft, such that the launch angle of a countermeasure can be adapted to the actual elevation and azimuth of the aircraft, especially if the aircraft flies with a relatively high speed.

The cartridge cases are arranged adjacent each other in a slidably manner, such that the cartridge cases may be tilted. In this way, the openings of the cartridges can be directed in the desired direction. The cartridge cases are adapted to be tilted forwards and backwards in a first direction. Preferably, they are also adapted to be tilted forwards and backwards in a second direction. The cartridge cases comprises in one example longitudinal interconnection means arranged in parallel with the centre axis, where adjacent cartridge cases are interconnected to each other in a slidable manner. The interconnection means may e.g. comprise longitudinal grooves and tongues interconnecting adjacent cartridge cases.

A cartridge case is advantageously provided with a square or rectangular cross-section. In this case, the interconnection means preferably extend on a plurality of the longitudinal external sides of the cartridge case. A cartridge case could also be provided with another cross-sectional shape, for example a round or polygonal shape. Depending on the cross-sectional shape, the interconnection means preferably extend on at least one external side of each cartridge case such that adjacent cartridge cases can be interconnected to each other.

The cartridge cases of a magazine are arranged to be tilted by a tilting means in a desired angle, e.g. with reference to the direction of motion of the aircraft or with reference to the mounting position of the magazine, such that the openings of the cartridges can be directed in the desired direction. The cartridge cases are adapted to be tilted from a first position to a second position. The first position may e.g. be a resting position and the second position may be an active position. In this description, the directions will be defined as follows, where directions relating to a helicopter are used. The forward direction of the aircraft is approximated as a direction with the nose pointing forwards, and being in the horizontal plane, i.e. floor and the rotor of the helicopter are parallel to the horizontal plane. The horizontal plane comprises a forward horizontal direction, i.e. the direction of motion of the helicopter, and a sideway horizontal direction, i.e. perpendicular to the forward horizontal direction. The vertical direction is defined as being perpendicular to the horizontal plane.

The resting position is typically a position in which the cartridge cases are directed in a first predefined direction. This position preferably represents a most likely launch direction for a countermeasure, such that a countermeasure can be launched without having to tilt the cartridge cases or with a required minimum of tilting. The resting position may also be the centre position of the tilting means, which may be a position in which the cartridge cases are perpendicular to a base plate of the magazine.

The active position is the launch position. In the launch position, the cartridge cases are directed in any possible direction, e.g. between 0-45 degrees forwards or backwards in the first direction and between 0-45 degrees forwards or backwards in the second direction. Hence, the cartridge cases of the magazine may be adapted to tilt from a resting position to an active position before a countermeasure is fired and to tilt back to the resting position after the countermeasure is fired. The cartridge cases may also tilt from a first launch position to a second launch position.

According to one aspect, the tilting means are preferably attached to a single tilt control cartridge case of the magazine. This cartridge case is preferably a cartridge case arranged in the centre of the magazine, but it is possible to use any position in the magazine for the tilt control cartridge case. The tilting means will tilt the tilt control cartridge case and the other cartridge cases, being slidable attached to each other, will follow the tilt control cartridge case and will thus be tilted by the same amount. The tilting means may e.g. comprise a bar positioned at a distance from a hinge-point. The bar interconnects the tilt control cartridge case with an actuating means. The actuating means may be arranged in the base plate. It is e.g. possible to let a cartridge case extend downwards with a pin that interacts with an actuating means in the base plate. The active position sensor may be positioned in the central cartridge case.

The invention also relates to a method for launching a countermeasure from a magazine. The countermeasure is arranged in a cartridge case comprised in the magazine. The method comprises the steps of: tilting the cartridge case from a resting position to an active position, launching the countermeasure, and optionally tilting the cartridge case back to the resting position.

The invention further relates to an aircraft comprising at least one inventive magazine according to any embodiment, or a combination of embodiments, previously disclosed herein. According to one aspect of an aircraft comprising an inventive magazine, a wide scanning range warning system, i.e. having a wide antenna lobe, of the aircraft can be used to identify that there is an incoming threat, i.e. object, whereby the more narrow scanning range radar/lidar tracking system of the magazine can be directed in the approximate direction of the incoming object and subsequently more accurately determine e.g. position, speed, distance and/or aspect angles of the incoming object. Thereby the opening of the cartridge cases of the magazine can be directed towards the incoming object, whereby countermeasures launched from the magazine can be used to disarm or destroy the incoming object.

BRIEF DESCRIPTION OF THE FIGURES

The invention will be described in greater detail in the following, with reference to the embodiments that are shown in the attached drawings, in which FIG. 1 schematically shows a side view of an aircraft provided with magazines according to an embodiment of the invention for storing and launching countermeasures, FIG. 2 schematically shows a side view of a magazine in a resting position according to the invention, FIG. 3 schematically shows a side view of a magazine in an active position according to the invention, and FIG. 4 schematically shows a cartridge comprising a tracking system according to the invention.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, forward, rearward, sideway, etc. refer to directions of an aircraft flying forwards in a normal orientation. For a magazine used on ground, directions may also be referred to as forward, rearward, sideway, left, right, etc.

Figure 1:
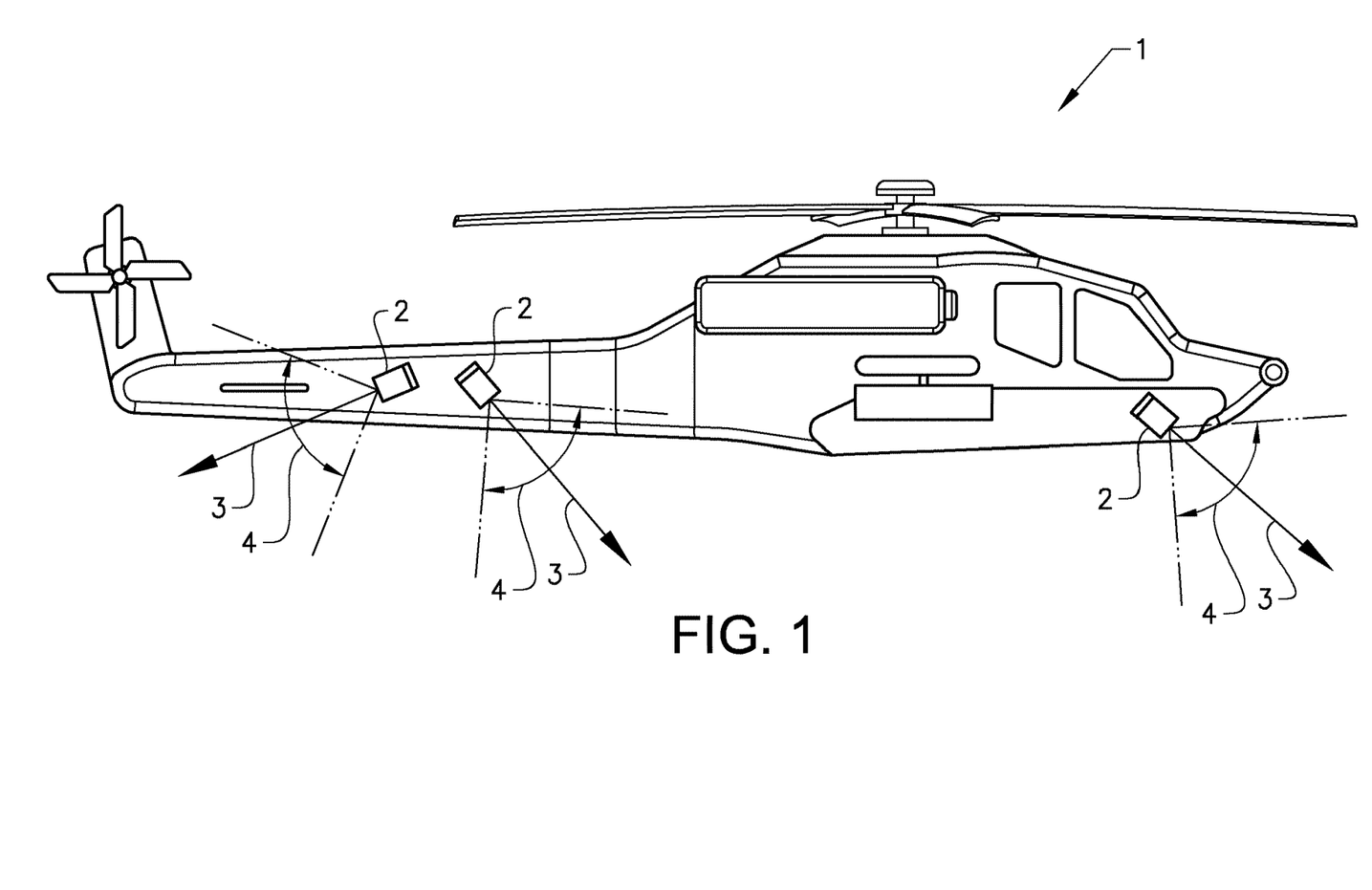

An aircraft 1 in the form of a helicopter, shown in FIG. 1, is provided with several magazines 2 for storing and launching payloads, hereinafter described as countermeasures 5.

The magazine may be mounted on aircrafts, on ground vehicles and may also be mounted in a stationary manner on a ground stand. The magazine 2 comprises a plurality of cartridge cases 6 which are longitudinal and where a cartridge case is adapted to store and launch a countermeasure. An arrow 3 designates the direction of launching from a magazine 2. The possible launch sector is denoted with 4. In the example shown in FIG. 1, one magazine 2 is placed at the front of the helicopter, pointing substantially forwards-downwards, and two magazines 2 are placed at the rear of the helicopter, where one magazine point forwards-downwards and one magazine point rearwards-downwards. The magazine further comprises a tracking system adapted to detect and track an incoming flying object, e.g. a shell from a handheld shell thrower.

Since the helicopter may hover or may fly upwards, downwards, forwards or sideways and with varying speeds, the desired launch direction will also depend on the actual flight direction of the helicopter as well as on the relative azimuth and elevation angle to an incoming object. The launch direction will also depend on the actual mounting position on the helicopter. Preferably, several magazines are mounted in different positions on a helicopter in order to cover different launch directions. In this way, it will be possible to launch countermeasures in most directions from the helicopter, such that the flight direction of the helicopter is not important in order to direct the countermeasure to a desired position. If two magazines are positioned such that the launch sectors of the magazines overlap, it is of advantage that both magazines track the incoming object. If the incoming object leaves the launch sector of one magazine, the other magazine will still be able to follow the incoming object. If the incoming object is in the launch sectors of both magazines, the tracking systems of the magazines can communicate with each other in order to decide which magazine that should launch a countermeasure, or if both magazines should launch a countermeasure.

A magazine 2 is described in more detail with reference to FIG. 2 and FIG. 3. In one example, the described magazine is adapted to be used on an aircraft and in the described example, a helicopter is used as an example of an aircraft. The magazine may also be used on ground, and may be mounted on a vehicle such as a landing craft, a truck or a battle tank, or may be mounted in a stationary position on the ground, e.g. by the use of a stand or a tripod. The magazine is preferably directed in a main direction from which the magazine can be tilted to a desired direction, e.g. when a moving object has been detected. In this way, one or a few magazine can be used to cover a large area. By tilting the magazine also in a vertical direction, the elevation angle of a countermeasure can be controlled. In the described example, the magazine is mounted on a helicopter.

The magazine 2 comprises a plurality of cartridge cases 6 arranged in a matrix with a number of rows and a number of columns. A suitable number of rows may e.g. be 3-8 and a suitable number of columns may e.g. be 5-12, depending on the size of a cartridge. A cartridge case is designed with a longitudinal body, preferably having a square or rectangular cross-section. The cross-section of a cartridge may e.g. be 1*1 or 1*2 inches and the length may e.g. be 8 inches. A cartridge case is adapted to receive a countermeasure 5 stored in a cartridge 12. The countermeasure cartridge 12 is attached to the cartridge case in a known way. The countermeasure cartridge 12 is further connected to a launch system of the aircraft, comprising a firing control. The countermeasure cartridge may either be connected directly to the launch system of the aircraft, or is connected to an electronic control unit of the magazine, which in turn is connected to the launch system of the aircraft. The interface between the countermeasure cartridge and the electronic control unit of the aircraft may be a mechanical system, which can only launch the countermeasure, or it may be an electrical interface, comprising two way communication between the countermeasure cartridge and the aircraft.

The magazine comprises a tracking system adapted to detect and track an incoming flying object, e.g. a shell from a handheld shell thrower. The tracking system comprises an active position sensor that is adapted to detect the position and speed of the incoming object as well as the distance and the aspect angles to the incoming object relative the aircraft. When an incoming object has been detected, the tracking system tilts the magazine in a direction towards the incoming object and a fine tracking function will then continuously follow the incoming object by fine adjusting the magazine direction. The fine tracking function will further preferably be able to detect the speed of the incoming object as well as the distance and the aspect angles to the incoming object, such that the tracking of the incoming object can be improved. In this way, the launch openings of the cartridge cases will be directed towards the incoming object. The magazine will thus be ready to launch a countermeasure when the incoming object has reached a predefined position. The predefined position will depend on the type of countermeasure used, some countermeasures may be adapted for a longer range and some for a shorter range. It is also possible to use different countermeasures adapted for different ranges at the same time, and launching them at different moments.

The tracking system is in the shown example integrated in the magazine and the active position sensor is positioned in a tracking cartridge placed in a cartridge case in the magazine. It is also possible to position the active position sensor on the outside of the magazine. In the shown example, the active position sensor is integrated in a removable tracking cartridge that is positioned in a cartridge case, here in a central cartridge case. The cartridge with the active position sensor may however be positioned in any of the cartridge cases. The active position sensor is adapted to detect and to follow a flying incoming object. A suitable and robust sensor may be a radar, a lidar or a vision system. In one example, one type of sensor is used for the detection of the incoming object and another sensor is used for the fine tracking of the incoming object. In such an example, a wide scanning range warning system having a wide antenna lobe is used to identify that there is an incoming threat and to determine the general direction to the incoming threat. The magazine, comprising a fine tracking function comprising a more narrow scanning range radar/lidar tracking system for the magazine, can be directed in the approximate direction of the incoming object. The fine tracking function can more accurately determine e.g. position, speed, distance and/or aspect angles of the incoming object, and can track and follow the incoming object. In this case, the fine tracking function may use an optical system.

The active position sensor is connected to an electronic control unit adapted to control the tilting means of the magazine in dependency of the signal from the active position sensor. When the tracking system detects an incoming object, the electronic control unit will control the magazine to point in the general direction of the incoming object and the fine tracking function will then fine adjust the direction of the magazine to point directly to the incoming object. The electronic control unit may also be positioned in the base of the magazine. The electronic control unit is also connected to an external control system, e.g. of an aircraft, and receives information regarding the flight parameters of the aircraft. The electronic control unit will also send information regarding an incoming object to the control system of the aircraft.

By mounting the active position sensor in a cartridge, the magazine can be used either as an active magazine comprising a tracking system, or as a passive tiltable magazine adapted for countermeasures and being controlled from an external electronic control unit positioned e.g. in an aircraft. By inserting a cartridge comprising a tracking system, the magazine will transform from a passive magazine to an active magazine comprising a tracking system. By mounting the active position sensor in a cartridge, it is also possible to use cartridges having different active position sensors. In one example, an infrared active sensor may be used when the system is used during night, and it can be replaced with another sensor suitable for other missions.

The magazine 2 comprises a base 7, which is the base of the magazine and is used to mount the magazine to e.g. an aircraft by the use of an attachment means. The magazine may be mounted directly to an attachment bracket on the aircraft with suitable mounting means. It is also possible to mount the magazine to an adapter bracket, which is used to create an interface for an existing mounting bracket on an aircraft. By using a suitable adapter bracket, the magazine can be mounted to an aircraft provided with standardized mounting brackets for fixed magazines. In this way, there is no need to upgrade the aircraft with new mounting brackets. Further, by using an adapter bracket, both fixed magazines and variable magazines can be used, depending on the actual needs. The base is used to mount the magazine to an aircraft. The base is also used to absorb the recoil force created when a countermeasure is launched. The base will absorb and distribute the created force over the entire base area of the base.

Each cartridge case 6 is attached to the base 7 through a flexible joint 16. For a magazine in which the cartridge cases can be tilted in two directions, a flexible joint which allows pivoting of the cartridge cases in two directions is used, such as a ball joint. If the cartridge cases should only tilt in one direction, the flexible joint may be a hinge. A ball joint allows the cartridge cases to be tilted in any direction. Each cartridge case is provided with a flexible joint. At the bottom of each cartridge case, a recoil plate 8 is arranged which is used to attach each cartridge case to the base through the flexible joint. The recoil plate will also transfer the recoil force from a countermeasure to the base when a countermeasure is launched. A cartridge case 6 is attached to a recoil plate 8 in a removable way, such that a countermeasure cartridge 12 can be inserted in the cartridge case. Since the cartridge cases are interconnected to each other to form the magazine, it is possible that all cartridge cases are removed at the same time as one unit when countermeasure cartridges are to be replaced. The flexible joint of one cartridge case will be arranged at a fixed position and will be mounted to the base in a fixed way. This cartridge case will be referred to as the tilt control cartridge case 17. This cartridge case is preferably arranged at the centre of the magazine, but it may also be arranged at a side or at a corner of the magazine. This cartridge case will be provided with a tilting means 25 which will tilt the magazine in a desired direction. In the shown example the tilt control cartridge case is arranged as a centre cartridge case.

A cartridge case 6 comprises a cavity 13, adapted to store a countermeasure cartridge 12 and is provided with an opening 14 at the front of the cartridge case. The countermeasure cartridges 12 are connected to a launch control unit (not shown) for feeding launch signals to the countermeasure cartridges. When a countermeasure has been launched, the countermeasure cartridge can be replaced with a new countermeasure cartridge by removing the remains of the launched countermeasure cartridge from the cartridge case and by inserting a new countermeasure cartridge into the cartridge case.

The base of the magazine is in the shown example further provided with a first rail 18 arranged along the z-axis and which is provided with a dovetail shape. The first rail is fixedly mounted to the base. The first rail intersects with the flexible joint of the tilt control cartridge case 17. The base is further provided with a fixed second rail 19, which is arranged along the x-axis. The fixed second rail intersects the flexible joint of the tilt control cartridge case 17 and is perpendicular to the first rail 18.

The first rail is adapted to hold several movable second rails 19 which are arranged along the x-axis, parallel to the fixed second rail. The movable second rails are in this example provided with a groove having a dovetail shape. The movable second rails 19 are adapted to glide on the first fixed rail and the movable second rails are thus provided with a dovetail shaped cut out adapted to cooperate with the dovetail of the first rail. It is also possible to use several spaced apart first fixed rails in order to increase the stability and precision of the magazine.

Each flexible joint is provided with a sliding block 20 attached to the flexible joint in a fixed manner. The sliding block is provided with a dovetail shape adapted to cooperate with the dovetail shaped groove of the second rail. The movable second rails and the sliding blocks allow the distance between two flexible joints to vary. When the cartridge cases are tilted, the flexible joints not arranged along the first fixed rail or the fixed second rail will have to move slightly away from the tilt control cartridge case 17 due to the relative geometric change between the cartridge cases. The movable second rails and the sliding blocks allow this movement. The dovetail shape of the first rail, the cut out of the second rails, the groove of the second rails and the sliding blocks will at the same time secure that the flexible joints are attached to the base. Depending on the required tilt angle for the magazine, it would e.g. also be possible to attach each flexible joint to the base with a resilient means such as rubber. It is important that the flexible joints bear against the base, since the recoil force from the recoil plate is transferred through the flexible joint to the base. Other interconnecting methods are also possible.

Figure 2:
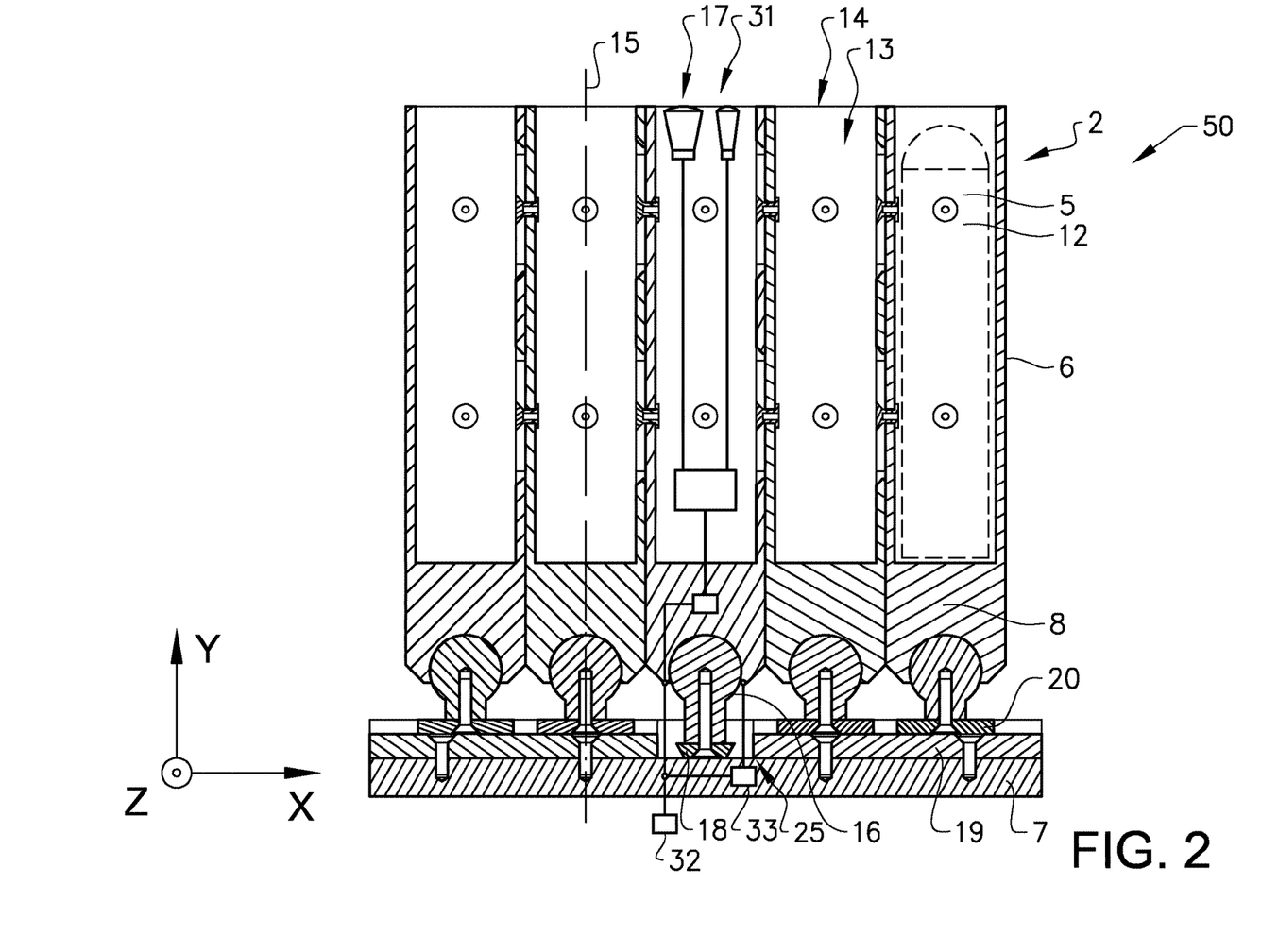

A magazine 2 positioned in a resting or idle position 50 is shown in FIG. 2. In this position, the centre axis 15 of a cartridge case is perpendicular to the base 7. This position is used as a reference position in this description. The tilt angle is zero degrees in the resting position and the centre axis is directed along a y-axis. The recoil base is directed in an x-z plane. The cartridge cases are arranged slidably to each other such that they bear against each other and such that they can slide against each other in the longitudinal direction.

Figure 3:
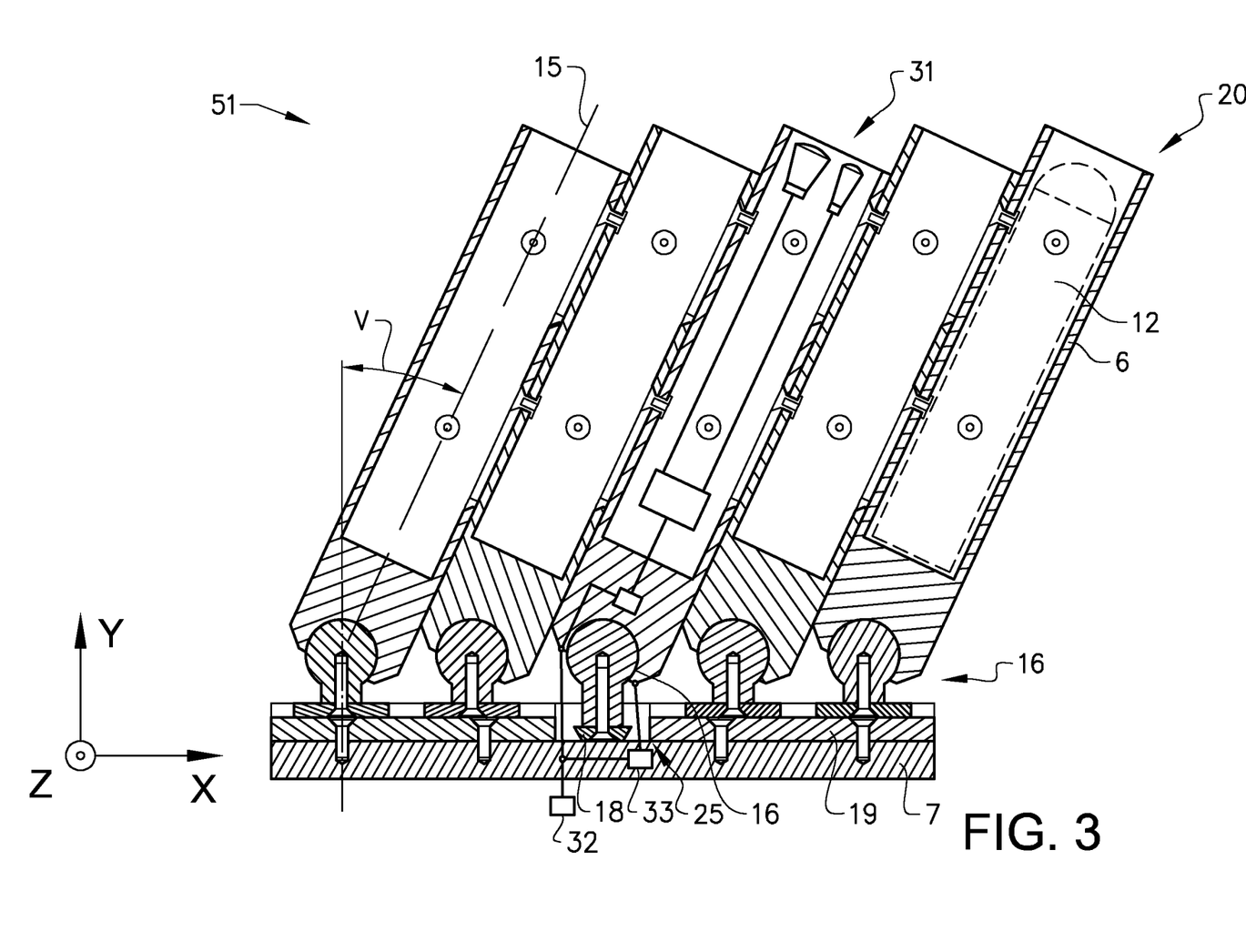

The cartridge cases of the magazine are adapted to be tilted from the resting position 50, shown in FIG. 2, to an active position 51, shown in FIG. 3. Since adjacent cartridge cases are arranged to each other in a slidable manner, the magazine can be tilted by a tilting means 25 to a selected angle. In the description, the selected tilt angle will be relative the resting position. When mounted on an aircraft, the selected angle is preferably referenced to a horizontal and vertical direction of the aircraft, or to an elevation and azimuth direction, such that the openings of the cartridge cases can be directed in the desired direction.

In FIG. 3, the magazine 2 is in an active position 51 with the cartridge cases inclined in a first direction. As shown in FIG. 3, the distance between the flexible joints has increased some compared to the resting position. The first direction is directed along the x-axis and the second direction is directed along the z-axis. The y-axis is parallel to the centre axis 15 of a cartridge case when positioned in the resting position. The inclination angle v is chosen depending on the intended use of a countermeasure and the active position may e.g. be directing the cartridges between plus and minus 30 degrees, and preferably by at least plus and minus 45 degrees in a first direction along the x-axis. In the active position, the cartridge cases may also be directed in a second direction along the z-axis, also by e.g. plus and minus 30 degrees, and preferably by at least plus and minus 45 degrees.

The cartridge cases of the magazine are arranged to each other in a slidable manner, such that they can slide against each other in a longitudinal direction. They are preferably attached to each other in a slidable manner, but it is also possible that some or all cartridge cases are only held to each other by e.g. a circumferential frame. In one example, the outermost cartridge cases are attached to each other, while the inner cartridge cases only bear at each other. This may simplify the replacement of used cartridges. The attachment means may e.g. be longitudinal interconnection means arranged in parallel with the centre axis 15 of the cartridge cases, such as longitudinal grooves and tongues. The cartridge cases may also be provided with T-shaped grooves with a nut interconnecting two adjacent cartridge cases. Other types of grooves are also possible. In order to provide an attachment between two cartridge cases without play, it is possible to position a longitudinal leaf spring between the cartridge cases, e.g. in the slit or groove or at the external sides. The leaf spring will compensate for tolerances and will prohibit vibrations and vibrating noise.

Figure 4:
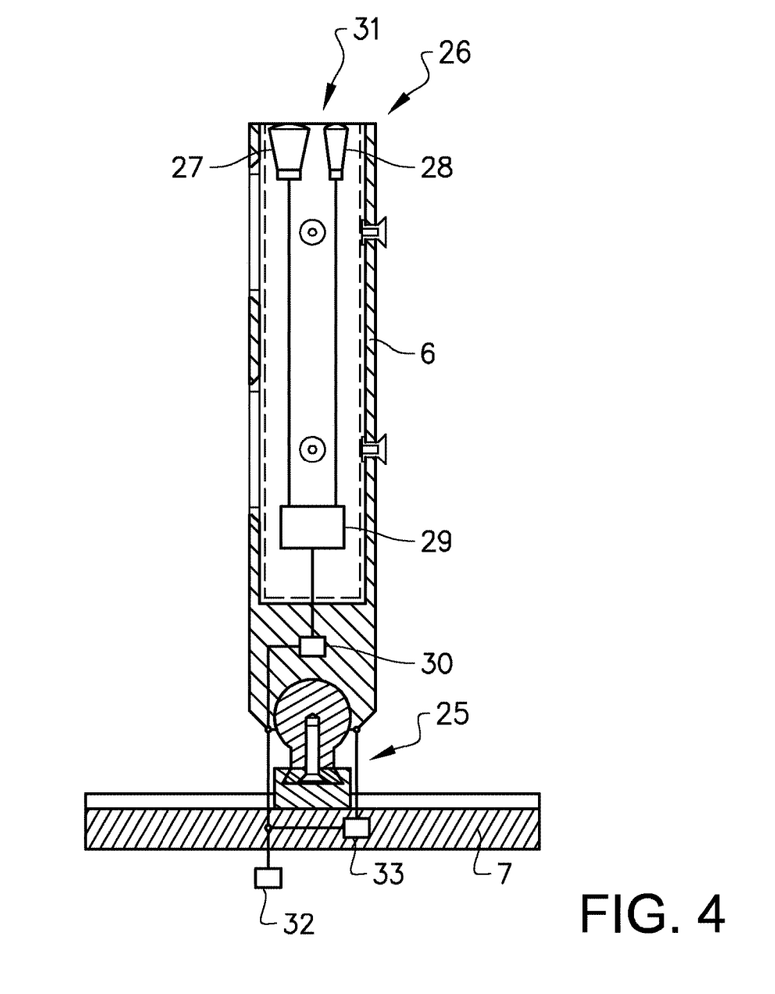

FIG. 4 schematically shows an example of a tracking system 26 arranged in a cartridge case 6 of a magazine 2. The tracking system may be arranged at a fixed position of the magazine or may alternatively be arranged in a replaceable cartridge 12. In the shown example, the tracking system 26 is arranged in a replaceable tracking cartridge 31 adapted to be placed in a cartridge case of the magazine. The tracking cartridge may also be arranged at one side of the magazine.

The tracking cartridge 31 comprises an active position sensor 27. The active position sensor is adapted to detect the position of an incoming object, e.g. a passive shell launched from a handheld shell thrower. Such a shell does not emit any active signals such that it can be detected by a passive sensor. The active position sensor is preferably a radar or a lidar which sends out a signal and detects and analyses the reflected response. The active position sensor may be a single sensor or may also comprise an additional sensor 28 adapted for fine tracking of the incoming object. The active position sensor will detect the position of the incoming object and will preferably also be able to detect the distance to the incoming object, the speed of the incoming object, and the aspect angles to the incoming object. The position, speed and distance signals from the active position sensor is transferred to an electronic control unit 29 positioned in the cartridge. The electronic control unit may also be positioned in the magazine or externally, e.g. in an aircraft or a vehicle. The electronic control unit is adapted to determine the position of the incoming object in relation to the position, speed and flight direction of the aircraft. The electronic control unit receives information regarding relevant flight parameters from the control system of the aircraft. The electronic control unit will send the information about the desired tilt angle to the electronic control unit 33 of the tilting means of the magazine. The electronic control unit 29 is connected to the control system 32 of the aircraft through a communication means 30. When the tracking system is integrated in the magazine, the electronic control unit 29 may also control the tilting means 25 directly.

One advantage of the inventive magazine is that the openings of the cartridge cases can be directed towards an incoming object. By being able to point directly towards an incoming object, it is possible to use countermeasures that can disarm or destroy the incoming object. Normal countermeasures can only disturb active incoming objects but have no effect on passive incoming objects. The inventive magazine will allow e.g. a helicopter to protect itself from passive shells in an efficient and cost-effective way.

The electronic control unit 29 of the tracking system and the electronic control unit that controls the tilting of the magazine may be positioned in the magazine or may be integrated in an external control system of e.g. an aircraft. The electronic control unit 29 may also control the launch of a countermeasure. It is also possible that the control of the tilting of the magazine, i.e. the tracking of an incoming object, is performed by an electronic control unit arranged in the magazine, and that the launch of a countermeasure is controlled by an external electronic control unit 32 arranged in e.g. an aircraft. By both controlling the tilting of the magazine and the launch of a countermeasure by an electronic control unit 29 arranged in the magazine, an autonomous track and launch system is obtained, which is able to detect and destroy an incoming object.

When an incoming object is detected by the tracking system, the cartridge cases are tilted in the direction of the incoming object, i.e. such that the centre axis of a cartridge case points in the direction of the incoming object. A fine tracking function of the tracking system will then continuously follow the incoming object and will continuously fine adjust the tilt angle of the cartridge cases to point directly at the incoming object. The tracking system may comprise an additional fine tracking sensor 28 that is adapted to track a detected object. When the incoming object reaches a predefined position in relation to the magazine, one or more countermeasures may be launched directly towards the incoming object in order to eliminate and destroy the incoming object. Such a countermeasure may e.g. be a cluster of small metal pellets which will cause the incoming object to detonate.

Depending on the distance to, speed of and angle to the incoming object, it is also possible to point the cartridge cases with an offset angle, such that the cartridge cases are directed to a position in front of the incoming object. This will compensate for the time delay when launching a countermeasure until the countermeasure reaches the incoming object.

The invention is not to be regarded as being limited to the embodiments described above, a number of additional variants and modifications being possible within the scope of the subsequent patent claims. The magazine may be mounted to both moving vehicles of all kinds and may also be mounted in a stationary manner, either fixed on e.g. a building or on a movable stand.

REFERENCE SIGNS

1: Aircraft
2: Magazine

3: Direction of launch
4: Launch sector
5: Countermeasure
6: Cartridge case
7: Base
8: Recoil plate
10: Ball joint
12: Cartridge
13: Cavity
14: Opening
15: Centre axis
16: Flexible joint
17: Tilt control cartridge case
18: First rail
19: Second rail
20: Sliding block
21: Interconnecting means
22: Longitudinal groove
23: Tongue
24: Longitudinal external side
25: Tilting means
26: Tracking system
27: Active position sensor
28: Fine tracking sensor
29: Electronic control unit
30: Communication means
31: Tracking cartridge
32: External electronic control unit
33: Tilt control unit
50: Resting position
51: Active position

The invention claimed is:

1. A magazine (2) for storing and launching countermeasures (5) arranged in cartridges (12), comprising a plurality of longitudinal cartridge cases (6) forming the magazine (2), wherein:
 the cartridge cases (6) are arranged to each other in a slidable manner in a longitudinal direction,
 the magazine (2) comprises a tilting means (25) configured to tilt the cartridge cases (6), such that an opening (14) of a cartridge case (6) is oriented in a selected direction, and
 the magazine (2) comprises a tracking system (26) comprising an active position sensor (27) configured to detect a position of an incoming object.

2. The magazine according to claim 1, wherein the active position sensor (27) is configured to detect the speed of an incoming object as well as the distance and the aspect angles to an incoming object.

3. The magazine according to claim 2, wherein the active position sensor (27) is a radar based sensor.

4. The magazine according to claim 2, wherein the active position sensor (27) is a laser based sensor.

5. The magazine according to claim 2, wherein the active position sensor (27) is a vision based sensor.

6. The magazine according to claim 5, wherein the magazine (2) comprises an electronic control unit (29) configured to, with the tilting means (25), control a tilting angle of the magazine (2) in dependency of a signal from the active position sensor (27).

7. The magazine according to claim 6, wherein the electronic control unit (29) is configured to launch a countermeasure (5) in dependency of the signal from the active position sensor (27).

8. The magazine according to claim 1, wherein the magazine comprises communication means (30) configured to transfer a signal from the active position sensor (27) to an electronic control unit (32) arranged externally of the magazine (2).

9. The magazine according to claim 8, wherein the magazine (2) is configured to receive a launch signal from the electronic control unit (32) in order to launch a countermeasure (5).

10. The magazine according to claim 1, wherein the magazine (2) is configured to tilt from a resting position (50) to an active position (51) in dependency of a signal from the tracking system (26) before a countermeasure (5) is launched.

11. The magazine according to claim 1, comprising the magazine (2) comprises a fine tracking sensor (28) configured to track an incoming object detected by the active position sensor (27).

12. A tracking cartridge (12) (31) configured to be used in a magazine (2) according to claim 1, wherein the cartridge (31) comprises an active position sensor (27) configured to detect the position of the incoming object, and communication means (30) configured to transfer a signal from the active position sensor to an electronic control unit (29, 32) arranged in the magazine (2) or externally of the magazine (2).

13. The tracking cartridge (31) according to claim 12, wherein the cartridge (31) further comprises an electronic control unit (29) configured to determine the position of an incoming object in dependency of the signal from the active position sensor (27).

14. A method for launching countermeasures (5) from the magazine (2) of claim 1, the method comprising the steps of:
tilting the cartridge cases (6) from a resting position (50) to an active position (51) in dependency of a signal from the tracking system (26), and launching at least one of the countermeasures (5) upon tilting of the cartridge cases (6) into the active position (51).

15. An aircraft comprising at least one magazine according to claim 1.

* * * * *

UNITED STATES PATENT AND TRADEMARK OFFICE
CERTIFICATE OF CORRECTION

PATENT NO.         : 10,684,099 B2
APPLICATION NO.    : 16/301186
DATED              : June 16, 2020
INVENTOR(S)        : Christer Zaetterqvist Page 1 of 1

It is certified that error appears in the above-identified patent and that said Letters Patent is hereby corrected as shown below:

In the Claims

Column 14, Claim 12, Line 30:
"A tracking cartridge (12)(31) configured to be used in"
Should read:
--A tracking cartridge (31) configured to be used in--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*